Aug. 4, 1936.    O. L. STARR    2,049,672
TRACTOR
Filed Dec. 4, 1933    3 Sheets-Sheet 1
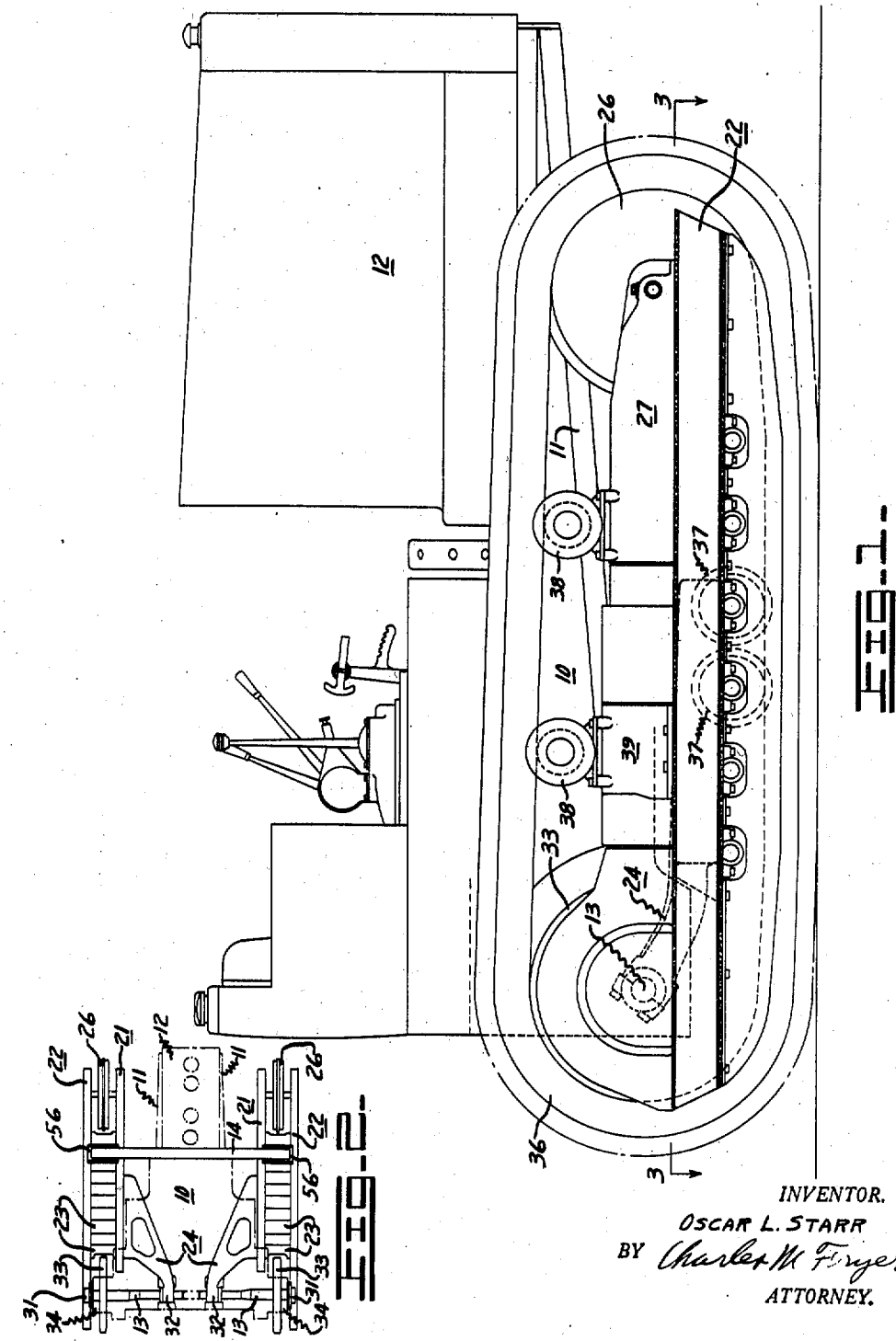
INVENTOR.
OSCAR L. STARR
BY Charles M. Finger
ATTORNEY.

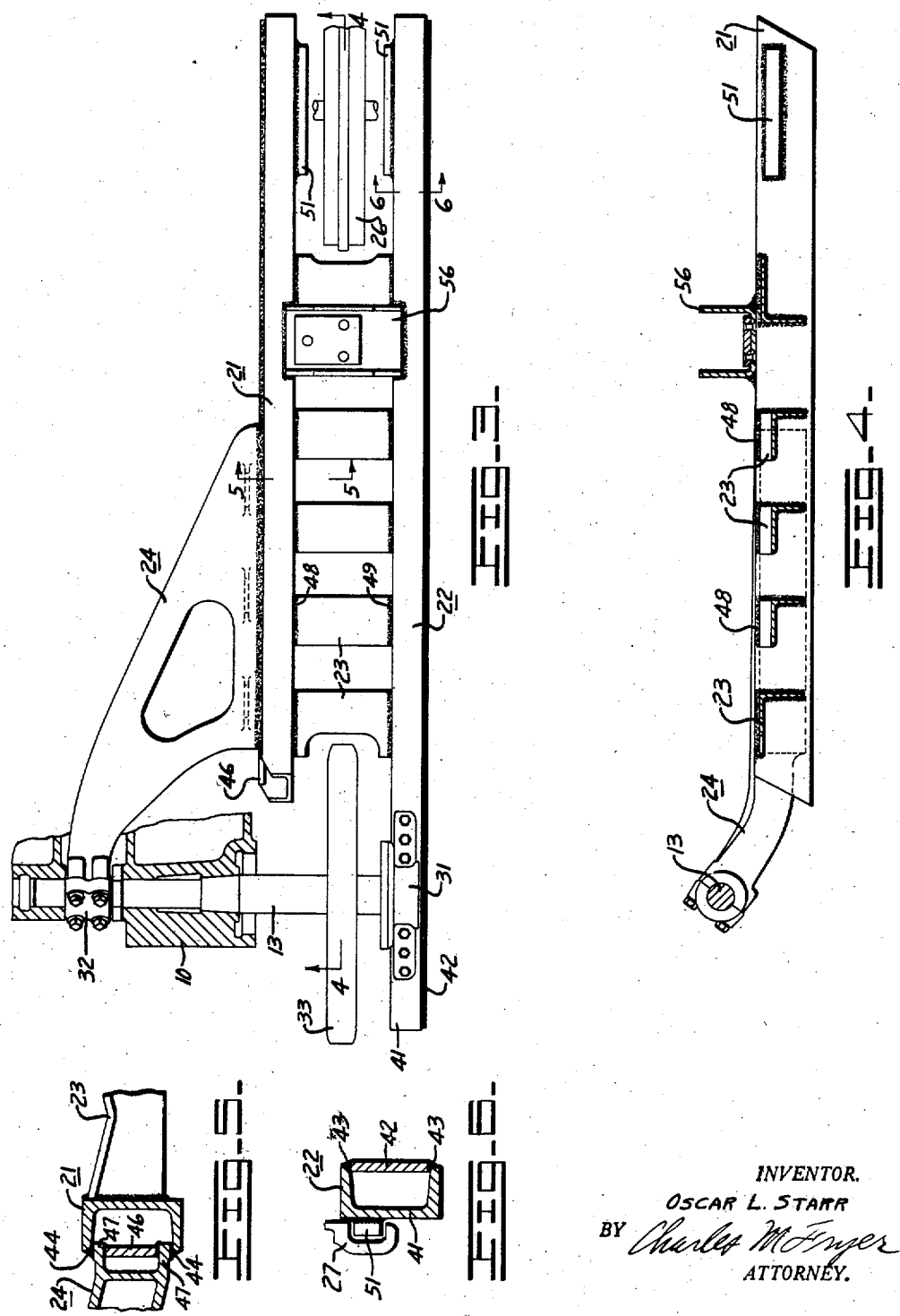

Aug. 4, 1936. O. L. STARR 2,049,672
TRACTOR
Filed Dec. 4, 1933 3 Sheets-Sheet 3
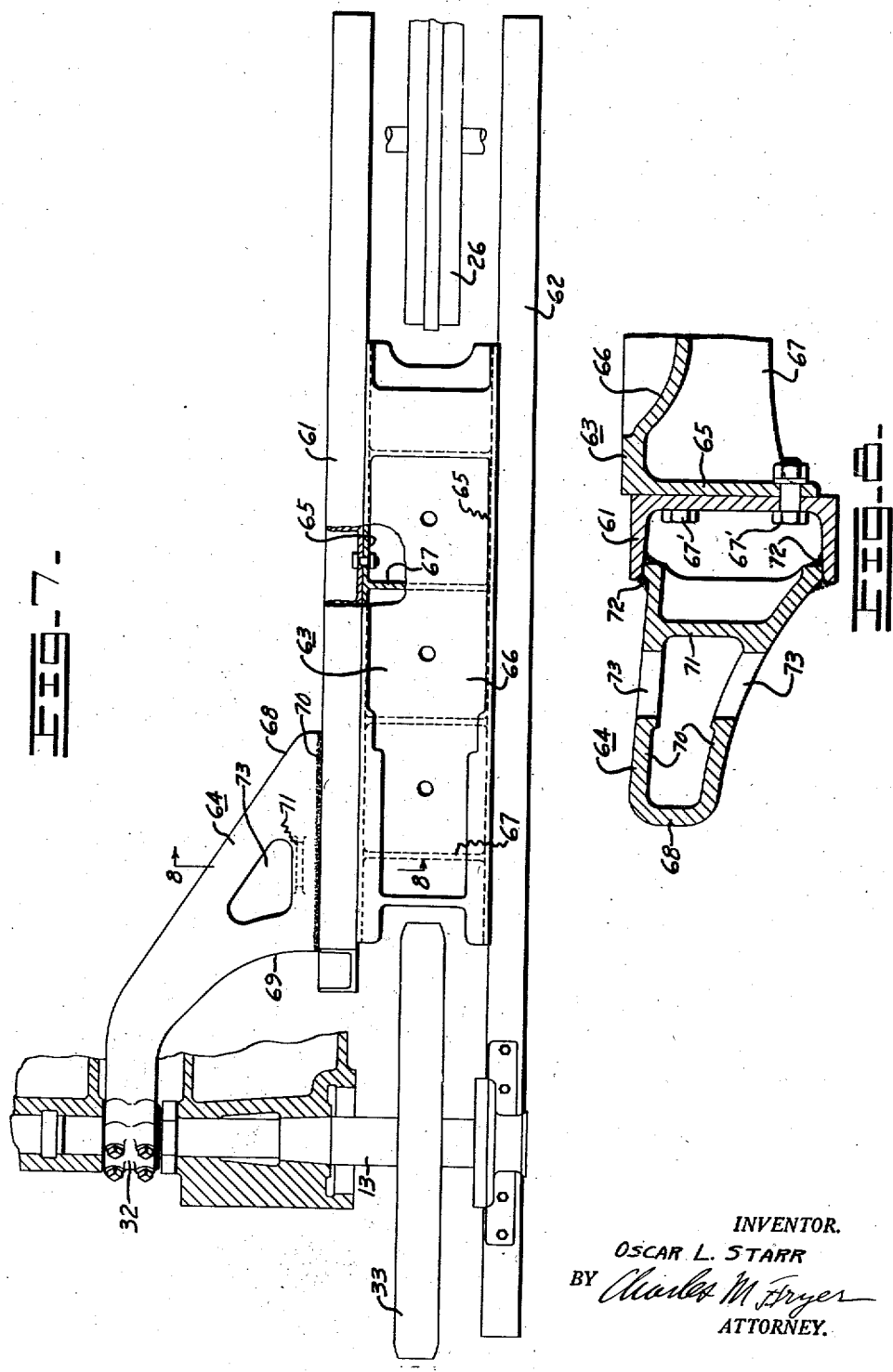
INVENTOR.
OSCAR L. STARR
BY Charles M Fryer
ATTORNEY.

Patented Aug. 4, 1936

2,049,672

UNITED STATES PATENT OFFICE 2,049,672

TRACTOR

Oscar L. Starr, Mission San Jose, Calif., assignor to Caterpillar Tractor Co., San Leandro, Calif., a corporation of California Application December 4, 1933, Serial No. 700,762

17 Claims. (Cl. 305—9)

The present invention relates to track-type tractors, and more particularly to the provision of a simple and rigid truck frame construction for the endless track mechanisms of the tractor; the truck frames being adapted to maintain said track mechanisms accurately aligned with respect to the tractor while transmitting heavy stresses.

In a track-type tractor, the main frame or body portion of the tractor is supported on a pair of spaced endless track mechanisms arranged longitudinally of the tractor at the sides thereof. The endless track mechanisms include truck frames which oscillate with respect to the main frame as the tractor travels over the ground. It is desirable that, during such oscillation, the truck frames be maintained in accurate alignment without distortion thereof while transmitting all types of stresses placed thereon to the main frame of the tractor.

A consideration of the heavy work which track-type tractors perform and the operation thereof in turning, makes it apparent that the type of truck frame construction is very important. In making short turns with such tractors, one of the endless track mechanisms is locked, while the other drives, whereby the resultant forces tend to twist the locked track mechanism on the ground. Thus, the truck frames are subjected to severe stresses in such turns, such stresses being unusually heavy when the draft forces are transmitted through the truck frames, as, for example, when a bulldozer is connected to such frames. The work of a track-type tractor where it must turn constantly under load while travelling over rough, uneven ground, particularly where draft forces or side thrusts from the implement are transmitted to the truck frames, requires the provision of a truck frame construction having a structure which is capable of transmitting heavy stresses to the main frame without distortion, such as twisting, weaving, and the like. At the same time, the truck frame construction should be of such character as to maintain accurate alignment of the truck frames with respect to the main frame of the machine.

The construction disclosed herein provides a truck frame which is capable of receiving and transmitting heavy bending moments and stresses, while maintaining the truck frames in their proper position. Each truck frame is substantially Y-shaped and preferably consists essentially of box-shaped or tubular members which effectively resist tension, compression and torsion stresses.

It is an object of the invention, therefore, to provide a track-type tractor having a truck frame construction adapted to receive heavy stresses of all types without being displaced from alignment with respect to the main frame.

Another object of the invention is to provide an integrally formed Y-shaped truck frame for the endless track mechanisms of a track-type tractor.

Another object of the invention is to provide an endless track mechanism for a track-type tractor, including a truck frame construction consisting essentially of tubular side members.

Another object of the invention is to provide a Y-shaped truck frame construction for track-type tractors, the open ends of each frame embracing a final drive mechanism, and being formed of substantially tubular members.

Another object of the invention is to provide a fabricated truck frame for track-type tractors of a construction adapted to successfully resist compression, tension and torsion stresses, the parts of the truck frame being molecularly united.

Another object of the invention is to provide a Y-shaped truck frame construction for track-type tractors adapted to embrace a final drive mechanism, one of the open ends of each frame comprising a tubular hinge member molecularly united to the body portion of the truck frame.

A further object of the invention is the provision of a truck frame, of the character described, which is of comparatively light construction and economical to manufacture.

Other objects will appear as the description progresses.

Description of figures

Fig. 1 is a right side elevation of a track-type tractor having a truck frame construction embodying the instant invention.

Fig. 2 is a diagrammatic plan view of a track-type tractor illustrating the suspension of the main frame, or body of the tractor, on the truck frames.

Fig. 3 is a plan view of a truck frame, taken on the line 3—3 in Fig. 1.

Fig. 4 is a vertical, longitudinal section taken on the line 4—4 in Fig. 3.

Fig. 5 is a fragmentary vertical transverse section taken on the line 5—5 in Fig. 3.

Fig. 6 is a fragmentary vertical transverse section taken on the line 6—6 in Fig. 3.

Figs. 7 and 8 illustrate a second form of the invention.

Fig. 7 is a plan view similar to Fig. 3.

Fig. 8 is a fragmentary vertical transverse section taken on the line 8—8 in Fig. 7.

Description of mechanism

The track-type tractor disclosed herein (Figs. 1 and 2) includes a main frame comprising transmission case 10 and opposite side members 11 extending forwardly therefrom to receive engine 12. The main frame is mounted upon a pair of opposite truck frames which are provided at their rear ends with aligned pivotal connections on shafts 13 mounted in transmission case 10. Equalizer spring 14 has its ends supported on the truck frame for free lateral movement with respect thereto and serves to support the front end of the tractor main frame. Thus, the suspension of the tractor main frame on the truck frames provides for limited oscillation of said truck frames in vertical planes parallel to the longitudinal center line of the tractor.

Each truck frame (Figs. 1 and 2) comprises side members 21, 22 connected together by a plurality of cross members 23, and a bracket or diagonal brace 24, which are described in detail hereinafter. Side members 21, 22 extend forwardly to carry front idler wheel 26 which is mounted in the forked front end of housing member 27 (Fig. 1) slidable upon the truck frame. Outer side member 22 (Fig. 3) extends rearwardly beyond inner side member 21, and cooperates with rearwardly and inwardly extending diagonal brace 24 to provide widely spaced pivotal connections 31, 32 with shaft 13. Adjacent the rear end of each truck frame between the rearwardly extending portion of side member 22 and brace 24, driving sprocket wheel 33 is suitably mounted for rotation about the axis of shaft 13, and is adapted to be driven by suitable final drive mechanism in final drive housing 34 (Fig. 2) secured to transmission case 10.

Endless track 36 (Fig. 1) passes around front idler 26 and driving sprocket 33. Truck rollers 37 mounted on the truck frame bear on the ground stretch of the endless track, while the upper stretch is supported on track carrier rollers 38 mounted on fixed housing member 27 and housing 39, respectively. Member 27 and housing 39 have telescopic engagement to allow for movement of member 27 and idler 26 when the track becomes clogged; the movement being controlled by a suitable spring recoil mechanism mounted within housings 27, 39.

The construction of the truck frames will now be described, and, as they are similar, only one frame will be described in detail. Each truck frame comprises a rigid, trussed structure consisting essentially of substantially tubular side members which are molecularly united, whereby any tension, compression and torsion stresses placed thereon do not affect the accurate alignment thereof with respect to the tractor main frame. The truck frame is substantially Y-shaped (Fig. 3); the rear open end of the Y providing a space to receive a final drive mechanism on the transmission case and to provide widely spaced bearing connections for the truck frame with the transmission case. By means of the widely spaced bearing connections and the molecularly united construction, such frame is maintained at all times in accurate alignment with the longitudinal center line of the tractor.

Side members 21, 22 are each of a tubular box construction fabricated by welding a plate between the flanges of a channel. Outer side member 22 (Figs. 3 and 6) is formed of channel 41 and plate 42 welded thereto along each flange, as at 43. The shorter inner side member 21 is of similar construction and has brace 24 and side plate 46 welded thereto (Fig. 5) as at 44. Plate 46 is notched adjacent its rear end to receive the upper and lower spaced end flanges 47 of brace 24; the flanges 47 being thus welded to both the flanges of channel 21 and to the upper and lower notched edges of plate 46. Both side members 21, 22 are joined by spaced transverse members 23, comprising angles having their ends joined to the webs of side members 21, 22, by welding thereto, as at 48, 49 (Figs. 3 and 4). It is, thus, seen that angle members 23 provide vertical and horizontal flanges between side members 21, 22 to provide a rigid trussed structure. As shown in Figs. 4 and 5, the intermediate transverse members 23 are bent downwardly in the center to provide spaces for the front idler recoil mechanism; idler 26 being guided in its sliding movement by the engagement of member 27 (Figs. 3 and 6) with guide bars 51 welded to the inner faces of side members 21, 22. Rearwardly of front idler 26, U-shaped bracket 56 (Figs. 3 and 4) has its ends welded to said side members 21, 22; the bracket being provided to receive and guide an end of equalizer spring 14 as shown in Fig. 2. In this connection, the inner side of housing member 27 is apertured to allow equalizer spring 14 to project therethrough; the aperture being large enough to permit the sliding movement of housing 27 without interference by bracket 56. Reference is made to assignee's copending application by Eberhard, Serial No. 533,427, filed April 28, 1931, for a more detailed description of the idler and recoil mechanism mounting.

The inner diagonal extension brace 24 of the truck frame, which together with the rear end of outer side member 22 forms the open end of the Y, comprises a tubular bracket previously referred to. The bracket is secured to inner side member 21 for a substantial distance, equal to approximately half the length of side member 21, and comprises an integral casting having a substantially rectangular cross section which is greatest at the truck frame end of the casing. From the truck frame end, brace 24 converges, as the casting extends inwardly and upwardly (Figs. 1 and 3), to bearing 32 on shaft 13. The construction of said bracket 24 is described in greater detail in connection with the form of truck frame shown in Figs. 7 and 8.

From the foregoing description, it is seen that the truck frame consists essentially of a plurality of substantially tubular or box members which are molecularly united by welding. The provision of molecular union between the various parts provides a simple, light and sturdy construction which provides complete rigidity to prevent twisting or weaving of the truck frame under stresses. Although for light work and the smaller tractors, it is not essential that the truck frame side members be tubular, it has been found that the provision of a substantially tubular or box construction of the principal members of the frame is extremely advantageous for large tractors adapted for heavy type of work. This is true, as there is absolutely no relative play permitted between the various members when molecularly united. Hence, the stresses are resisted by the inherent strength of the construction rather than by providing any play between the members. Maintaining the truck frame in accurate alignment without distortion due to twisting or weaving, is extremely advantageous as it prevents undue wear on the endless track mechanism which would otherwise be caused by operation of the track when the truck frame is in a distorted position.

In the second form of the invention illustrated in Figs. 7 and 8, the truck frame comprises inner side channel 61, outer side channel 62 (Fig. 7), central member 63 and diagonal brace or bracket 64. Front idler 26 and driving sprocket 33 are located and supported in a manner similar to that described with respect to the modification of Figs. 1 through 6. Central member 63 (Figs. 7 and 8) comprises an integral casting including side walls 65 and top wall 66 reinforced by a plurality of spaced vertical transverse webs or stiffening members 67; the side walls 65 being secured to the webs of channels 61 and 62 by fastening members 67'. Webs 67 (Fig. 7) are provided throughout the length of casting 63 to form a rigid trussed structure.

Diagonal brace 64 (Figs. 7 and 8) comprises a substantially tubular box casting of rectangular cross section which is greatest at its outer end and converges to bearing 32 on shaft 13. Side walls 68 and 69 (Fig. 7) of casting 64 are integral with top and bottom walls 70 thereof; the top and bottom walls being integrally united by a short longitudinally extending stiffening wall 71 closely adjacent the wider or outer end of the casting or diagonal brace 64. The top and bottom walls 70, therefore, form flanges extending outwardly from wall 71, which flanges are positioned between the upper and lower flanges of inner side channel 61, being molecularly united to the flanges of channel 61 by weld unions 72.

It will be noted that side walls 68 and 69, together with the adjacent portions of the top and bottom walls 70, in actuality, form integrally united channel-like converging truss members, to impart rigidity to the brace; and because of the length of the connection between the brace and side channel 61 and the comparatively wide spacing between side walls 68 and 69 adjacent the outer end of the brace, a double truss effect is provided from side channel 61 to shaft 13. The described construction provides a brace which serves effectively as a tension, compression or torsion resisting member. Apertures 73 in the top and bottom walls 70 of the brace are core holes formed in casting of the brace, and serve to allow for escape of dirt, rocks and the like which might otherwise lodge on the top of the brace.

The modification illustrated in Figs. 7 and 8 has the brace 64 welded or molecularly united to the truck frame; the truck frame parts 61, 62, and 63 being secured by fastening members. This type of construction is adapted for lighter types of tractors adapted for lighter work. For the heavier duty tractor, the modification disclosed in Figs. 1 through 6 is employed, because of the rigidity of such construction, which at the same time is comparatively light and economical to build. In the modification of Figs. 1 through 6, it will be again noted that the outer end of the brace extends substantially half the distance of inner side member 21, thus providing for great strength. Because of the fact that in both modifications, the outer ends of the upper and lower walls of the brace are molecularly united in overlapping relationship with the upper and lower flanges of the inner truck frame side member, a rigid box construction obtains at the location where stresses are most severe to provide for strength of construction. In effect, such upper and lower flanges provide socket means for telescopically receiving an end portion of the hinge brace, as can be seen from Figs. 5 and 8.

Therefore, I claim as my invention:

1. A truck frame construction for track-type tractors comprising side members, transverse members between and welded to said side members, a space being provided between said side members at one end to receive a movably mounted wheel, opposite parallel guide members welded on said side members for guiding movement of said wheel, a transverse guide member welded to said truck frame for receiving a connection from said truck frame to the tractor body, a brace having one end welded to one of said side members and extending rearwardly therefrom, the other end of said brace being adapted to provide a pivotal connection from said truck frame to the tractor body, and means on said other of said side members to provide a second pivotal connection from said truck frame to the tractor body, said second connection being spaced from and axially aligned with said first-mentioned pivotal connection.

2. In a track-type tractor, a truck frame comprising tubular side members, transverse members integrally united to said side members, and a tubular brace member integrally united to one of said side members and extending rearwardly therefrom in spaced relation to the other of said side members to provide a forked end for said frame, said brace member being united to said one of said side members for a substantial distance and having converging truss portions extending inwardly and rearwardly from said one of said members to provide a double truss construction.

3. In a track-type tractor having a body, a truck frame for hinged connection with said body comprising tubular side members, transverse members integrally united to said side members, and a tubular brace member integrally united to one of said side members and extending rearwardly therefrom in spaced relation to the other of said side members to provide a forked end for said frame.

4. In a track-type tractor, a truck frame comprising tubular side members united together in spaced relationship, and a hinge brace welded to one of said side members.

5. A truck frame for an endless track mechanism of a track-type tractor comprising spaced longitudinal members of box construction, said longitudinal members having differing lengths, transverse members between said longitudinal members and molecularly united thereto, and a bracket secured by molecular union to the shorter of said members and extending therefrom in spaced relation with the longer of said longitudinal members to provide a forked end for said truck frame.

6. In a vehicle, a truck frame comprising a body portion including spaced tubular members, and spaced tubular extensions at one end of said body portion to provide spaced aligned points of pivotal connection between said frame and the vehicle, at least one of said extensions being secured to said body portion by welding.

7. In a track-type tractor, a body portion, a truck frame terminating at one end in forked tubular extensions to provide spaced pivotal connections between said body portion and said frame, at least one of said extensions having a welded connection with said truck frame.

8. In a track-type tractor, a truck frame body having spaced flanges at a side thereof, and a hinge brace having spaced members molecularly united to said flanges in overlapping relationship with respect to said flanges.

9. In a track-type tractor, a truck frame body having spaced flanges at a side thereof, and a hinge brace having an end positioned between and welded to said flanges.

10. In a track-type tractor, a truck frame body having spaced upper and lower flanges at a side thereof, a hinge brace having spaced upper and lower members welded to said flanges in overlapping relationship with respect to said flanges, and a plate member welded to and cooperating with said flanges to provide a rigid reinforced side construction.

11. In a track-type tractor, a truck frame body, a diagonal hinge brace of integral construction, said brace having an end and converging non-parallel sides extending diagonally with respect to said end, and a weld union between said truck frame body and said brace end.

12. In a track-type tractor, a truck frame comprising a body including tubular side members rigidly united together, and an inwardly extending tubular hinge brace rigidly connected to said body.

13. In a vehicle, a truck frame, comprising a body portion of rigid construction, and tubular spaced extensions at one end of said body portion adapted to be hingedly connected with a part of said vehicle, one of said extensions projecting diagonally inwardly from said body portion to provide a brace.

14. In a track-type tractor, a truck frame body, a diagonal hinge brace structure having an end and converging non-parallel sides extending diagonally with respect to said end to provide a double truss construction, and a weld union between said truck frame body and said brace structure end.

15. In a track-type tractor, a truck frame body, a tubular hinge brace extending inwardly with respect to said body and adapted to be hingedly connected with a part of said tractor, and means for rigidly connecting said tubular hinge brace with said body including a weld union at the end of said tubular hinge brace adjacent said body.

16. In a track-type tractor; a truck frame body; a tubular hinge brace extending inwardly with respect to said body and adapted to be hingedly connected with a part of said tractor; and means for rigidly connecting said tubular hinge brace with said body including means rigid with said body and receiving an end portion of said tubular hinge brace in overlapping relationship, and a weld union between said means and said end portion.

17. In a track-type tractor; a truck frame body; a hinge brace extending inwardly with respect to said body and adapted to be hingedly connected with a part of said tractor; and means for rigidly connecting said hinge brace with said body including socket means rigid with said body and receiving an end portion of said hinge brace in telescoping relationship, and a weld union between said socket means and said end portion.

OSCAR L. STARR.

---

CERTIFICATE OF CORRECTION.

Patent No. 2,049,672.

August 4, 1936.

OSCAR L. STARR.

It is hereby certified that error appears in the printed specification of the above numbered patent requiring correction as follows: Page 3, second column, line 39, claim 3, strike out the words "having a body"; line 40, same claim, strike out "for hinged connection with said body"; and that the said Letters Patent should be read with these corrections therein that the same may conform to the record of the case in the Patent Office.

Signed and sealed this 27th day of October, A. D. 1936.

(Seal)

Henry Van Arsdale
Acting Commissioner of Patents.

8. In a track-type tractor, a truck frame body having spaced flanges at a side thereof, and a hinge brace having spaced members molecularly united to said flanges in overlapping relationship with respect to said flanges.

9. In a track-type tractor, a truck frame body having spaced flanges at a side thereof, and a hinge brace having an end positioned between and welded to said flanges.

10. In a track-type tractor, a truck frame body having spaced upper and lower flanges at a side thereof, a hinge brace having spaced upper and lower members welded to said flanges in overlapping relationship with respect to said flanges, and a plate member welded to and cooperating with said flanges to provide a rigid reinforced side construction.

11. In a track-type tractor, a truck frame body, a diagonal hinge brace of integral construction, said brace having an end and converging non-parallel sides extending diagonally with respect to said end, and a weld union between said truck frame body and said brace end.

12. In a track-type tractor, a truck frame comprising a body including tubular side members rigidly united together, and an inwardly extending tubular hinge brace rigidly connected to said body.

13. In a vehicle, a truck frame, comprising a body portion of rigid construction, and tubular spaced extensions at one end of said body portion adapted to be hingedly connected with a part of said vehicle, one of said extensions projecting diagonally inwardly from said body portion to provide a brace.

14. In a track-type tractor, a truck frame body, a diagonal hinge brace structure having an end and converging non-parallel sides extending diagonally with respect to said end to provide a double truss construction, and a weld union between said truck frame body and said brace structure end.

15. In a track-type tractor, a truck frame body, a tubular hinge brace extending inwardly with respect to said body and adapted to be hingedly connected with a part of said tractor, and means for rigidly connecting said tubular hinge brace with said body including a weld union at the end of said tubular hinge brace adjacent said body.

16. In a track-type tractor; a truck frame body; a tubular hinge brace extending inwardly with respect to said body and adapted to be hingedly connected with a part of said tractor; and means for rigidly connecting said tubular hinge brace with said body including means rigid with said body and receiving an end portion of said tubular hinge brace in overlapping relationship, and a weld union between said means and said end portion.

17. In a track-type tractor; a truck frame body; a hinge brace extending inwardly with respect to said body and adapted to be hingedly connected with a part of said tractor; and means for rigidly connecting said hinge brace with said body including socket means rigid with said body and receiving an end portion of said hinge brace in telescoping relationship, and a weld union between said socket means and said end portion.

OSCAR L. STARR.

CERTIFICATE OF CORRECTION.

Patent No. 2,049,672.

August 4, 1936.

OSCAR L. STARR.

It is hereby certified that error appears in the printed specification of the above numbered patent requiring correction as follows: Page 3, second column, line 39, claim 3, strike out the words "having a body"; line 40, same claim, strike out "for hinged connection with said body"; and that the said Letters Patent should be read with these corrections therein that the same may conform to the record of the case in the Patent Office.

Signed and sealed this 27th day of October, A. D. 1936.

(Seal)

Henry Van Arsdale
Acting Commissioner of Patents.

CERTIFICATE OF CORRECTION.

Patent No. 2,049,672. August 4, 1936.

OSCAR L. STARR.

It is hereby certified that error appears in the printed specification of the above numbered patent requiring correction as follows: Page 3, second column, line 39, claim 3, strike out the words "having a body"; line 40, same claim, strike out "for hinged connection with said body"; and that the said Letters Patent should be read with these corrections therein that the same may conform to the record of the case in the Patent Office.

Signed and sealed this 27th day of October, A. D. 1936.

(Seal)

Henry Van Arsdale
Acting Commissioner of Patents.